May 22, 1928.
F. JEFFREY
1,671,076
INDUCTION MOTOR CONTROL SYSTEM
Filed May 29, 1920
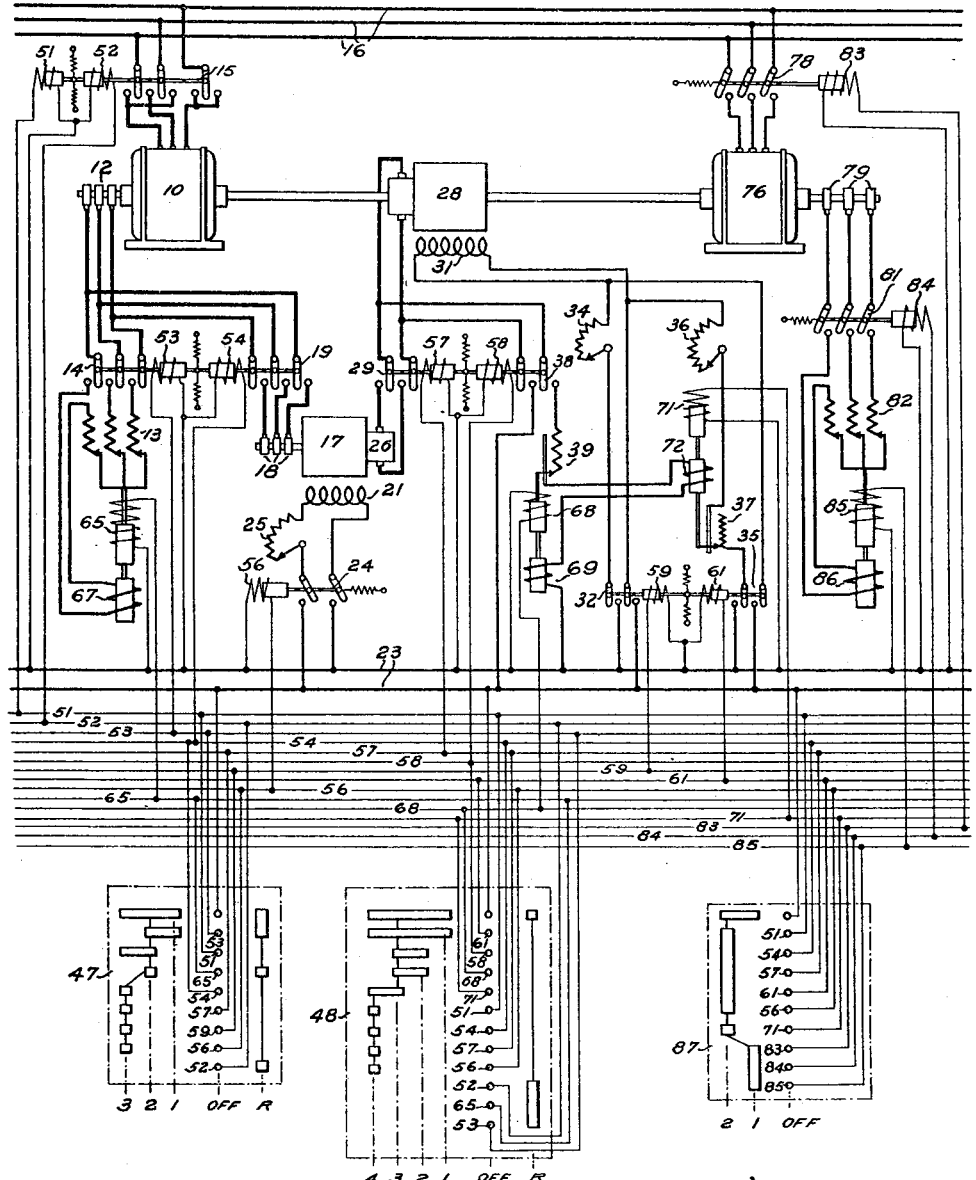
Inventor
F. Jeffrey
by
Attorney Patented May 22, 1928.

1,671,076

UNITED STATES PATENT OFFICE.

FRASER JEFFREY, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

INDUCTION-MOTOR-CONTROL SYSTEM.

Application filed May 29, 1920. Serial No. 385,794.

This invention relates in general to the speed control of induction motors, and has particular relation to the speed control of induction motors where the control is exercised through a rotary converter and a direct current machine interconnected with the induction motor.

One system of control of induction motors, known commercially as the Kraemer system, involves the use of a rotary converter having its alternating current side connected to the secondary of the induction motor and its direct current side connected to the armature of a direct current machine adapted to supply energy to and absorb energy from the alternating current system in which the induction motor is connected. Such a system of control is capable of producing satisfactorily stable operation of the motor at different speeds below synchronism, and this without the heavy losses present where the lower speeds are secured by inserting resistance in the secondary circuit of the motor.

With this Kraemer system of control, the speed is varied by varying the excitation of the field of the direct current machine. In theory, a set of this character is just as readily operable at any speed above synchronism as below synchronism, the variation in speed from the minimum subsynchronous speed being effected by the reduction of the field of the direct current motor to zero, at which time, according to the theory, the speed of the set should be the synchronous speed of the induction motor, and to bring the speed above synchronism should be merely a matter of reversing and increasing the field on a direct current machine. However, due, probably in the greater part, to the presence of considerable induction in the circuit which includes the secondary of the induction motor through the rotary converter and the direct current machine, even with no load on the induction motor, it is extremely difficult and impracticable to bring the set through actual synchronism and to a stable operating speed above synchronism. This is the case to a greater extent when there is a load upon the induction motor.

It is an object of this invention to provide an improved method of controlling induction motors, and an improved system of control for induction motors in accordance with which the speed is controlled through a rotary converter and a direct current machine and the set is operable at any desired speed below or above synchronous speed of the induction motor.

This and other objects and advantages are attained by this invention, various novel features of which will appear from the description and drawing forming part of this application, and disclosing an embodiment of the invention, and will be more particularly pointed out in the claims.

The drawing is a diagrammatic showing of a system of induction motor control embodying features of this invention.

According to the illustrative disclosure, an induction motor 10 has its secondary winding of the phase-wound type, and connected through slip rings 12 and a switch 14 to a variable resistance 13 and has its primary circuit connected through a reversing switch 15, to a supply circuit 16. A rotary converter 17 has its alternating current side connected through slip rings 18 and a switch 19, to the slip rings 12 of the induction motor 10. The direct current field 21 of the rotary converter 17 is connected to a direct current supply line 23 through a switch 24, a variable resistance 25 in the form of a rheostat being included in the field circuit. The direct current side 26 of the rotary converter 17 is connected to the armature of the direct current machine 28, the armature being here shown as mounted upon the shaft of the induction motor 10. The connection between the rotary converter and the direct current machine is through a switch 29.

The field 31 of the direct current machine is supplied from the direct current source 23 through a switch 32, a variable resistance 34, preferably in the form of a rheostat, being provided in the field circuit. An auxiliary connection between the field 31 and the circuit 23 is provided through a switch 35, the connections being such that closure of the field circuit through the switch 35 has the effect of completing this circuit in a direction opposite to that existing when the circuit is closed through the switch 32. A variable resistance 36, preferably in the form of a rheostat, is provided in the circuit of the switch 35. An automatically operable variable resistance 37 is also provided in the circuit of the field 31 closed through the switch 35 and the rheostat 36. An auxiliary connection is provided between the supply circuit 23 and the armature of the direct current machine 28, this connection being completed through a switch 38, an automatically operable variable resistance 39 being included in this circuit.

As indicated in the illustrative disclosure, the control of the various switches is preferably through operating electromagnets, the circuits of the magnets being energized in any desired selective fashion, as through the drum controllers 47 and 48, shown diagrammatically. All of the controlling switches are biased to open position, as by means of springs, as indicated in the drawing. Certain of the switches interlock with others to insure that but one of the interlocked switches is closed at any instant. The energizing circuits of the operating electromagnets are completed from the direct current supply line 23 through the controller drums 47 and 48 in such a manner as to secure the desired sequence of operations.

The reversing switch 15 in the primary circuit of the motor 10 is closed to cause forward operation of the motor by the operating magnet 51, and is closed in a reverse direction by operating magnet 52. The arrangement of the operating magnets and the spring biasing means are such that the switch is returned to open position when both of the electromagnets are de-energized, as indicated in the drawing.

The switch 14 is actuated by the electromagnet 53, and the switch 19 by the electromagnet 54, the electromagnets 53 and 54 being mechanically related so that operation of one of the switches to closed position prevents closure of the other switch at the same time. The interlocking means may be anything desired, the means shown including a mechanical connection between the operating means for the two switches and a double-acting spring means effective to return both of the switches to open position when both magnets are de-energized. The switch 24 is actuated by the operating magnet 56. The switch 29 is actuated by the electromagnet 57, and the switch 38 by the electromagnet 58, the switches 29 and 38 and their operating means being so related as to insure the closure of only one of these switches at the same time. The switch 32 is actuated by the electromagnet 59, and the switch 35 by the electromagnet 61, the two switches and their operating means being interrelated in substantially the same manner as the pairs of switches described above, so as to insure closure of only one of the interrelated switches.

The operating means for the variable resistance 13 in the secondary circuit of the induction motor 10 is of a type suitable to secure the automatic cutting-out of the resistance as the speed of the motor increases during the starting operation, the arrangement being designed to prevent excessive current in the circuit of the motor while insuring the proper degree of acceleration of the motor. The type of automatic regulator shown in connection with the resistance 13 includes an electromagnetic actuating device comprising a core and its winding 65 supplied from the circuit 23 through the controller drum 48, this winding tending to operate the regulator in a direction to cut out resistance, and a second core and its winding 67 in series with the secondary circuit of the motor 10, the latter element of the regulator exerting an effect opposite to that of the electromagnet 65. The regulator is biased by gravity, as indicated, or other suitable means, to the position that includes maximum resistance in the secondary circuit. During starting of the motor, the electromagnet 65 is effective to actuate the regulator only as fast as the series winding of the electromagnet 67 will permit, this speed of operation being predetermined so as to provide for a safe current in the secondary circuit of the motor.

The automatic regulator for the variable resistance 39 is of substantially the same type as that described in connection with the variable resistance 13 in the secondary circuit of the motor 10, and includes an electromagnet 68 supplied from the source 23 through the controller drum 48, and an electromagnet 69 having its winding in series with the resistance 39 in the armature circuit of the direct current machine 28, through the switch 38. The regulator is biased by gravity, as indicated, or other suitable means, to the position which includes maximum resistance in circuit. The energizing effects of the electromagnets 68 and 69 on the regulator are opposite, the general design being such that the magnet 68 is effective to operate the regulator to cut out resistance only as fast as the series winding of the magnet 69 permits, this rate being predetermined from the safe rate of acceleration of the machine 28, when the latter is operated as a motor from the supply line 23, as will be described hereinafter.

The automatic regulator for the variable resistance 37 includes an electromagnet 71 supplied from the circuit 23 through the controller drum 48, and an electromagnet 72 having its winding in series with the armature circuit of the machine 28, which is completed through the switch 38. This automatic regulator is biased by gravity, as indicated, or other suitable means, to a position wherein the resistance 37 is cut out of circuit, energization of the series magnet 72 tending to hold the regulator in this position. Energization of the electromagnet 71 is effective to cause the regulator to insert the resistance 37 at a predetermined rate depending upon the counter E. M. F. of the machine 28 as measured by the current in the armature circuit in which the winding of magnet 72 is included.

In starting the induction motor, for operation thereof at a speed below synchronism, controller 47 is moved to position No. 1, wherein the circuit of the winding 53 is closed, causing closure of the switch 14. In position No. 2 of this controller, the switch 15 is closed in the forward direction through energization of the electromagnet 51. Likewise, the electromagnet 65 is energized and the automatic regulator is effective to cut out the resistance 13 at a speed determined by the current in the series magnet 67, and thus permit the motor to be brought up to speed at the predetermined rate. The maximum motor speed with these connections is slightly below synchronism.

To operate the set at a variable speed below synchronism, the controller 47 is moved to position No. 3, wherein electromagnet 65 is de-energized, electromagnet 53 is de-energized and electromagnet 54 is energized, causing opening of the switch 14 and closure of the switch 19, thus connecting the secondary of the motor 10 to the alternating current side of the rotary converter 17, and electromagnet 56 is energized to cause closure of the field switch 24 of the rotary converter 17 connecting the field circuit to the supply line 23. Likewise, electromagnet 57 is energized, causing closure of the switch 29 to connect the rotary converter to the direct current machine 28, and electromagnet 59 is energized, causing closure of the switch 32 to connect the field circuit 31 of the direct current machine 28 to the supply line 23.

With the connections completed in position No. 3 of the controller, the speed of the induction motor is dependent upon the amount of resistance in the circuit of the field 31 of the direct current machine 28, and the power factor of the system is dependent upon the amount of resistance in the field circuit 21 of the rotary converter 17. It will be apparent that with the above connections, the speed of the set can readily be varied from a speed approximating synchronism to a lower speed determined by the size of the rotary converter and the direct current machine relative to the induction motor 10.

In case it is desired to operate the motor at speeds above synchronism, the required connections might be made through the controller 47, but for purposes of present convenience these connections are made through a drum controller 48. Assume that the induction motor is at rest. Movement of the controller 48 to position No. 1 causes energization of the electromagnet 61 and consequent closure of the switch 35, thus completing the field circuit 31 of the direct current machine for current flow in a direction opposite to that in which current flows when this circuit is completed through the switch 32. Under these conditions, the rheostat 36 and the automatically operated rheostat 37 are set to allow full field on the motor. Movement of the controller to position No. 2 causes energization of the magnet 58 and consequent closing of the switch 38, completing the armature circuit of the direct current machine 28 from the circuit 23. The electromagnet 68 is also energized, the effect of energization of this magnet being to tend to move the regulator for the variable resistance 39 in such a direction as to cut out resistance; but the resistance-decreasing operation of the regulator is hindered by the electromagnet 69 whose winding is in series with the armature of the machine 28, to such an extent as to permit acceleration of the machine 28 at a safe rate. When the resistance 39 has been entirely cut out, the rheostat 36 may be operated to insert resistance in the field circuit to further increase the speed of the machine 28.

In position No. 3 of the controller 48, the electromagnet 71 is energized and tends to cut out the variable resistance 37, being opposed by the electromagnet 72 whose winding is in series in the armature circuit of the machine 28, the resistance-decreasing operation occurring at a rate that insures the required degree of acceleration of the machine 28 at the higher speeds. It is advisable that the automatically regulated resistance be so designed as to be effective to bring the speed of the direct current machine 28 and the parts associated therewith up to a predetermined speed somewhat above synchronism, with substantially all or the greater part of the rheostat resistance 36 included in the field circuit.

On movement of the controller to position No. 4, the remainder of the variable resistance 37 is cut into circuit, in case such operation has not been completed in position No. 3 of the controller; and the electromagnet 51 is energized to cause closure of the switch 15 in a forward direction, the electromagnet 54 is energized to cause closure of switch 19, the electromagnet 56 is energized to cause closure of the switch 24 and the electromagnet 57 is energized and the electromagnet 58 de-energized to cause closure of the switch 29 and opening of the switch 38. At the same time, the electromagnet 68 is de-energized, permitting the automatic regulator for the variable resistance 39 to drop down to its normal resistance-in position. With these connections made, the speed of the set can readily be varied by variation of the resistance 36 in the field circuit 31 of the machine 28. Likewise, the power factor of the system may readily be varied by variation of the resistance 25 in the circuit of field 21 of the rotary converter.

As another feature of this invention in the matter of bringing the speed of the induction motor 10 to synchronous speed and sufficiently above the same to warrant stable operation of the motor at any super-synchronous speed, it is pointed out that when the motor 10 is operating fairly close to synchronous speed, the energy of the secondary circuit is hardly sufficient to produce rotation of the rotary converter 17, or, at most, only rotation at a very slow speed. If now the switching arrangements are such as to permit the application of direct current of a variable voltage to the armature of the converter and the field of the converter is in the proper direction, the converter will operate inverted. The first effect, in case the converter is actually stopped, will be the passage of direct current through the rotary armature and slip rings, this energy exciting the secondary of the induction motor and pulling the same up to actual synchronous speed. In case the converter is not actually at rest, the application of sufficient voltage to the direct current side of the converter will produce sufficient counter torque to bring the converter armature to rest, and at approximately this time, sufficient direct current excitation of the secondary of the motor 10 will cause the latter to pull into synchronism. The continued application of direct current voltage to the converter will cause the latter to rotate in the opposite direction, producing an alternating current at the slip rings, this current being reversed in phase with respect to the current that flows in this circuit when the motor 10 is operating at a sub-synchronous speed. With these conditions, the speed of the motor 10 builds up above synchronism to a value dependent upon the frequency of the current at the slip rings of the converter. The armature of the converter and the direct current machine 28, in case the latter is used to assist in bringing the rotor of the motor 10 above synchronous speed, may now be disconnected from the circuit 23 and the converter and the armature of the machine 28 connected together directly, in case this connection is not already made. With the direction of current flow in the field of the machine 28 reversed from that existing during sub-synchronous operation, it will be apparent that any desired super-synchronous speed of operation of the motor 10 may be obtained by suitably adjusting the excitation of the field of the machine 28.

In order to obtain substantially the same effect as that described in connection with reversing the field 31 of the direct current machine 28 during the operation of the controller 48 described above, the direction of current flow through the field may remain the same as for operation at sub-synchronous speeds and one phase of the circuit between the induction motor 10 and the rotary converter 17 may be reversed.

In order to secure quick stopping of the induction motor 10, both of the controllers 47 and 48 may be provided with a single reverse position, indicated as R. When the controller is moved from a running position through off position, to the position R, indicating reverse, the connections made through the controller are such that the electromagnet 52 is energized, causing closure of the switch 15 in reverse direction, electromagnet 53 is energized and electromagnet 54 de-energized, causing closure of switch 14 and opening of switch 19, and electromagnet 65 is energized. The current in the secondary winding of the induction motor is immediately increased due to the fact that it has impressed thereon a voltage greater than the normal primary voltage. This increased current acts as a load upon the machine 10 and serves as a brake to decrease the speed of the machine. As the speed of the machine and the current in the secondary winding decrease, the electromagnet 67 whose winding is in series with the secondary circuit of the motor, acts to insure the presence of only sufficient resistance in the secondary circuit to maintain the load on the induction machine at a maximum safe value during slowing down, thus insuring stoppage of the motor in a minimum time.

As an auxiliary or substitute means for driving the rotor of the induction motor 10 at a speed above synchronism to permit operation of the motor under its own power at speeds above synchronous speed, an induction motor 76 may be provided. This induction motor has a number of poles less than that of the induction motor 10, and hence, a synchronous speed higher than that of the motor 10. The primary circuit of the motor 76 is supplied from the supply circuit 16 through a switch 78, and the secondary winding of this motor is connected through its slip rings 79 and the switch 81, to a variable resistance 82.

As has been described in connection with the other apparatus of the unit, the switches 78 and 81 and an automatic regulator for the variable resistance 82 are preferably actuated by electromagnets controlled from a drum controller or other means. The switch 78 is actuated by an electromagnet 83, and the switch 81 by an electromagnet 84. The automatic regulator for the variable resistance 82 is controlled by an electromagnetic actuating device comprising an electromagnet 85 whose winding is completed through the controller, this latter electromagnet tending to shift the regulator in such a direction as to cut out resistance, and an electromagnet 86 whose winding is in series with the secondary circuit of the motor and tends to prevent shifting of the regulator by the electromagnet 85 except when current conditions in the secondary winding are such as to warrant cutting out of the resistance 82. This automatic regulator is biased by gravity, as indicated, or other suitable means, to the position that includes maximum resistance in the secondary circuit; and it is generally similar to that described for controlling the variable resistance 13 in the secondary circuit of the induction motor 10. A separate controller 87 is shown for controlling operation of the induction motor 76; but it will be apparent that one or the other of the controllers 47 and 48 might be modified to include means for securing the desired control of this motor.

It will be apparent that the motor 76 may be of such size relative to the induction motor 10 and the direct current machine 28 that the motor 76 alone may be operative to bring the shaft of the motor 10, and probably any ordinary load thereon, to the required speed above synchronous speed of the motor 10; and there would be no necessity, under these circumstances, of operating the direct current machine 28 as a motor to bring the speed of the induction motor 10 above synchronism. On the other hand, the induction motor 76 may be of a comparatively small size, in case it is intended for operation in conjunction with the direct current machine 28 for bringing the speed of the set above synchronous speed of the induction motor 10.

For purposes of convenience, assume that induction motor 76 alone is used to bring the induction motor 10 to a speed above synchronism. On movement of the controller 87 to position No. 1, electromagnets 83 and 84 are energized to cause closure of the switch 78 in the primary circuit and the switch 81 in the secondary circuit, respectively, of the motor 76; and electromagnet 85 is energized at the same time. With these connections made, it will be apparent that the machine 76 is automatically accelerated, the rate of acceleration being determined by the effect of the series electromagnet 86 acting in opposition to the electromagnet 85, on the variable resistance 82.

Under ordinary conditions, the speed of the motor 76 will, through the action of the automatic regulator in the secondary circuit, rise to a point somewhat slightly below synchronism for this motor. This speed attained by the motor 76 should be appreciably above synchronous speed of the induction motor 10; and, when the desired speed has been reached, the controller 87 may be moved to position No. 2, in which position the electromagnets 83, 84 and 85 are de-energized, causing opening of the switches 78 and 81 and de-energization of the electromagnet 85 of the automatic regulator in the secondary circuit. In this position of the controller, electromagnets 51, 54, 56, 57 and 61 are energized to cause closure of switch 15 in a forward direction, switch 19, switch 24, switch 29 and switch 35 respectively. At the same time, the electromagnet 71 of the automatic regulator for variable resistance 37 is energized, a suitable amount of resistance, probably the entire resistance, being automatically cut into the field circuit of the machine 28 through the action of this regulator.

It will be apparent that the connections are now the same as have been described in connection with position No. 4 of the controller 48, and are proper for operation of the motor 10 at any desired speed above synchronism. As described previously, the speed of the set is varied by varying the resistance in the field circuit 31 of the direct current machine 28. The power factor of the system is varied as desired by variation of the resistance 25 in the field circuit 21 of the rotary converter.

If, instead of using the induction motor 76 alone to bring the set above synchronous speed of the induction motor 10, the motor 76 is used in conjunction with the direct current machine 28, the desired operation of the system for increasing the speed of the shaft of the motor 10 up to the desired value is secured by moving controller 48 through position No. 1, to position No. 2, and, at the same time, moving controller 87 to position No. 1. With these latter connections, both the induction motor 76 and direct current machine 28 are free to exercise their motor effects in speeding up the shaft of the induction motor 10. It will be apparent that the desired connections for operating the system above synchronous speed may be secured by operating the controller 48 to position No. 4, and controller 87 to position No. 2.

As a safety means for insuring the making of the proper switch connections, it may be desirable to interlock the controllers 47 and 48 so that, in case either is in any position other than off position, the other controller cannot be moved from off position. Interlocks of the general type required are often used in connection with a plurality of controller drums and, accordingly, there is no necessity for any detailed description thereof.

It will be apparent that the set can readily be brought from a sub-synchronous operating speed to a super-synchronous speed, provided the load on the set is not beyond the power of the machines 28 and 76, singly or in conjunction, by manipulation of the controllers 48 and 87 in the proper manner, as described above.

It should be understood that it is not desired that the invention claimed be limited to the exact details of construction and operation shown and described, for obvious modifications will occur to one skilled in the art.

It is claimed and desired to secure by Letters Patent:

1. In combination, an induction motor having a phase-wound rotatable secondary, and means for controlling the speed of said motor comprising a rotary converter whose alternating current side is connectible to the secondary of said induction motor, a direct current machine adapted to operate either as a motor or a generator, a separate source of electrical power connectible in circuit with one of said machines and adapted to insure an increase in the operating speed of the rotatable element of said induction motor from a sub-synchronous to a super-synchronous value, and controlling devices for selectively establishing an operative condition wherein said direct current machine is connected to the direct current side of said rotary converter for operation of said induction motor under normal conditions of sub-synchronous operation or causing said separate source to supply energy required to insure raising the speed of the rotatable element of said induction motor from a sub-synchronous to a super-synchronous value.

2. In combination, an induction motor having a phase-wound secondary, and means for controlling the speed of said motor comprising a rotary converter whose alternating current side is connectible to the secondary of said induction motor, a direct current machine adapted to operate either as a motor or a generator, the commutator of said direct current machine being connectible to the direct current side of said rotary converter, a separate source of direct current energy connectible to the commutator of one of said commutator-type machines and capable of causing the supply of energy through said machine to the secondary of said induction motor to cause operation of the latter at a speed above synchronous speed, and means for selectively connecting the commutator of said direct current machine to the commutator of said rotary converter for obtaining normal operating speeds of said induction motor or connecting said separate source of direct current energy to one of said commutator-type machines for raising the speed of said induction motor from a sub-synchronous to a super-synchronous value.

3. In combination, an induction motor having a phase-wound rotatable secondary element, and means for controlling the speed of said motor, said means comprising a rotary converter whose alternating current side is connectible to the secondary of said induction motor, a direct current machine having its armature mechanically connected to the rotor of said induction motor and adapted to operate either as a motor or a generator, a separate source of direct current energy connectible to the armature of said direct current machine and adapted to cause said direct current machine to drive the rotor of said induction motor at a speed above its synchronous speed, and means for selectively connecting the armature of said direct current machine to the direct current side of said rotary converter for obtaining normal operating speeds of said induction motor or to said separate source of direct current energy for causing operation of said direct current machine as a motor for raising the speed of said induction motor from a sub-synchronous to a super-synchronous value.

4. In combination, an induction motor having a phase-wound secondary, and means for controlling the speed of said motor to secure operation thereof at speeds below and above synchronous speed, said controlling means comprising a rotary converter, a direct current machine mechanically connected to the rotor of said induction motor and adapted to operate either as a motor or generator, the alternating current side of said converter being electrically connectible to the secondary of said induction motor, a separate source of electrical energy, and means for selectively connecting the armature of said direct current machine to the direct current side of said rotary converter or to said separate source of electrical energy for operation of said machine as a motor for purposes of carrying the speed of said induction motor from a sub-synchronous value to a stable super-synchronous value.

5. In combination, an induction motor having a phase-wound rotatable secondary element, and means for controlling the speed of said motor, said means comprising a device capable of converting alternating current and vice versa, the alternating current side of said converting device being connectible to the secondary of said induction motor, a direct current machine adapted to operate either as a motor or generator, an auxiliary source of electrical energy, and means for selectively causing the operation of said induction motor at a sub-synchronous or super-synchronous speed with the secondary of said induction motor connected to the alternating current side of said converting device and the direct current side of the latter connected to the armature of said direct current machine or causing said auxiliary source of electrical energy to raise the speed of said induction motor from a sub-synchronous value to a stable super-synchronous operating value through the supply of electrical energy from said auxiliary source to a portion of that circuit which normally includes said induction motor, said converting device and said direct current machine.

6. The method of producing operation of the induction motor of a Kraemer unit at stable super-synchronous operating speeds, which comprises supplying electrical energy from a separate source to the direct current machine of said Kraemer unit to insure bringing the speed of said induction motor from a sub-synchronous value through synchronous speed and up to a stable super-synchronous value, and adjusting the field excitation of said direct current machine with its armature connected to the direct current side of the converter of said Kraemer unit and the alternating current side of said converter connected to the secondary of said induction motor to secure the desired stable super-synchronous operating speed thereof.

In testimony whereof, the signature of the inventor is affixed hereto.

FRASER JEFFREY.